United States Patent
Lakamp et al.

(10) Patent No.: US 7,603,384 B2
(45) Date of Patent: Oct. 13, 2009

(54) INDIVIDUALIZING AND ENCRYPTING ON-DEMAND MEDIA CONTENT IN RETAIL KIOSKS

(75) Inventors: Brian D. Lakamp, Malibu, CA (US); David C. Blight, Oceanside, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 492 days.

(21) Appl. No.: 11/223,164

(22) Filed: Sep. 9, 2005

(65) Prior Publication Data

US 2007/0067340 A1 Mar. 22, 2007

(51) Int. Cl.
 *G06F 17/30* (2006.01)
(52) U.S. Cl. .............. 707/104.1; 707/3; 725/1; 705/400
(58) Field of Classification Search ............... 707/2–5, 707/102, 104.1; 725/1, 44; 705/400
 See application file for complete search history.

(56) References Cited

U.S. PATENT DOCUMENTS

| | | | |
|---|---|---|---|
| 6,961,712 B1 * | 11/2005 | Perkowski | 705/27 |
| 7,209,892 B1 * | 4/2007 | Galuten et al. | 705/26 |
| 7,305,484 B2 * | 12/2007 | Munetsugu et al. | 709/231 |
| 2002/0194081 A1 * | 12/2002 | Perkowski | 705/26 |
| 2005/0102191 A1 * | 5/2005 | Heller | 705/26 |
| 2005/0251456 A1 * | 11/2005 | Perkowski | 705/26 |
| 2007/0005503 A1 * | 1/2007 | Engstrom et al. | 705/59 |
| 2007/0168287 A1 * | 7/2007 | McCarthy et al. | 705/51 |

\* cited by examiner

*Primary Examiner*—Cheryl Lewis
(74) *Attorney, Agent, or Firm*—Samuel S. Lee; Procopio, Cory, Hargreaves & Savitch LLP

(57) ABSTRACT

A system for selecting and recording data, comprising: a local storage unit for storing a subset of media content items and other content; a content selection unit to display a catalog of the media content items and other content, to allow a customer to browse, search, and select a media content item and other content from the catalog of media content items and other content, to retrieve the selected media content item and other content from the local storage unit if the selected media content item and other content is found in the subset, and otherwise to retrieve the selected media content item from a remote storage unit, the content selection unit configured to cache the retrieved media content item and other content in the local storage unit for a period of time based on the popularity of the retrieved media content item; a financial transaction unit to determine the cost of the retrieved media content item and other content and display the cost for review and payment by the customer; and an authoring system configured to format, encode, encrypt, and write the media content item and other content onto an article of media when the customer makes the payment.

31 Claims, 5 Drawing Sheets

United States Patent US 7,603,384 B2

INDIVIDUALIZING AND ENCRYPTING ON-DEMAND MEDIA CONTENT IN RETAIL KIOSKS

BACKGROUND

The present invention relates to selecting and recording media content data, and more specifically, to individualization and encryption of on-demand media content for retail distribution.

Data terminals are employed in a variety of contexts to provide goods and services to consumers. Thus, distribution of these goods and services is managed by the data terminal communicating and exchanging information to and from a remote host computer or other communicating device.

For example, in a banking service context, automated teller machines ("ATMs") are employed to allow bank customers to make cash withdrawals, deposits, and transfers. Furthermore, since ATMs are often deployed in convenient and open locations, ATMs provide a cost-effective, convenient, and secure method by which banks can process transactions of the bank customers. Such data terminals are configured in one of a stand-alone mode, where access to the host computer is established over the public telephone network, and in a cooperative mode, where access to the host is established over a private dedicated communication network.

Data terminals can also be employed in the media content distribution context to provide each individual customer with ready access to tens of thousands of movie titles, as well as educational programming, network programming, audio programming and the like.

SUMMARY

Implementations of the present invention provide methods and apparatus to select and record media content data for retail distribution using a data terminal.

In one implementation, a system for selecting and recording data is disclosed. The system comprises: a local storage unit for storing a subset of media content items and other content; a content selection unit to display a catalog of the media content items and other content, to allow a customer to browse, search, and select a media content item and other content from the catalog of media content items and other content, to retrieve the selected media content item and other content from the local storage unit if the selected media content item and other content is found in the subset, and otherwise to retrieve the selected media content item from a remote storage unit, the content selection unit configured to cache the retrieved media content item and other content in the local storage unit for a period of time based on the popularity of the retrieved media content item; a financial transaction unit to determine the cost of the retrieved media content item and other content and display the cost for review and payment by the customer; and a video disk authoring system configured to format, encode, encrypt, and write the media content item and other content onto an article of media when the customer makes the payment.

In another implementation, a method for selecting and recording data is disclosed. The method comprises: storing a subset of media content items and other content in a local storage unit; displaying a catalog of the media content items and other content; enabling a customer to browse, search, and select a media content item and other content from the catalog of media content items and other content; retrieving the selected media content item and other content from the local storage unit if the selected media content item and other content is found in the subset; retrieving the selected media content item from a remote storage unit if the selected media content item and other content is not included in the subset; caching the retrieved media content item and other content in the local storage unit for a period of time based on the popularity of the retrieved media content item; determining the cost of the retrieved media content item and other content; displaying the cost for review and payment by the customer; and formatting, encoding, encrypting, and writing the media content item and other content onto an article of media when the customer makes the payment.

In another implementation, a computer program, stored in a tangible storage medium, for selecting and recording data is disclosed. The program comprises executable instructions that cause a computer to: store a subset of media content items and other content in a local storage unit; display a catalog of the media content items and other content; enable a customer to browse, search, and select a media content item and other content from the catalog of media content items and other content; retrieve the selected media content item and other content from the local storage unit if the selected media content item and other content is found in the subset; retrieve the selected media content item from a remote storage unit if the selected media content item and other content is not included in the subset; cache the retrieved media content item and other content in the local storage unit for a period of time based on the popularity of the retrieved media content item; determine the cost of the retrieved media content item and other content; display the cost for review and payment by the customer; and format, encode, encrypt, and write the media content item and other content onto an article of media when the customer makes the payment.

DESCRIPTION

Implementations of the present invention provide methods and apparatus to select and record media content data for retail distribution using a data terminal. In one implementation, a media content selection and recording system provides individualization and encryption of on-demand media content for retail distribution. In this implementation, the data terminal is configured as a retail kiosk, which provides an individual customer with ready access to a large number of movie titles in a convenient low-cost manner that fully satisfies the customer demand, while enhancing the economic incentives of content providers to create and distribute an expanding offering of movies and other video/audio content.

Figure 1:
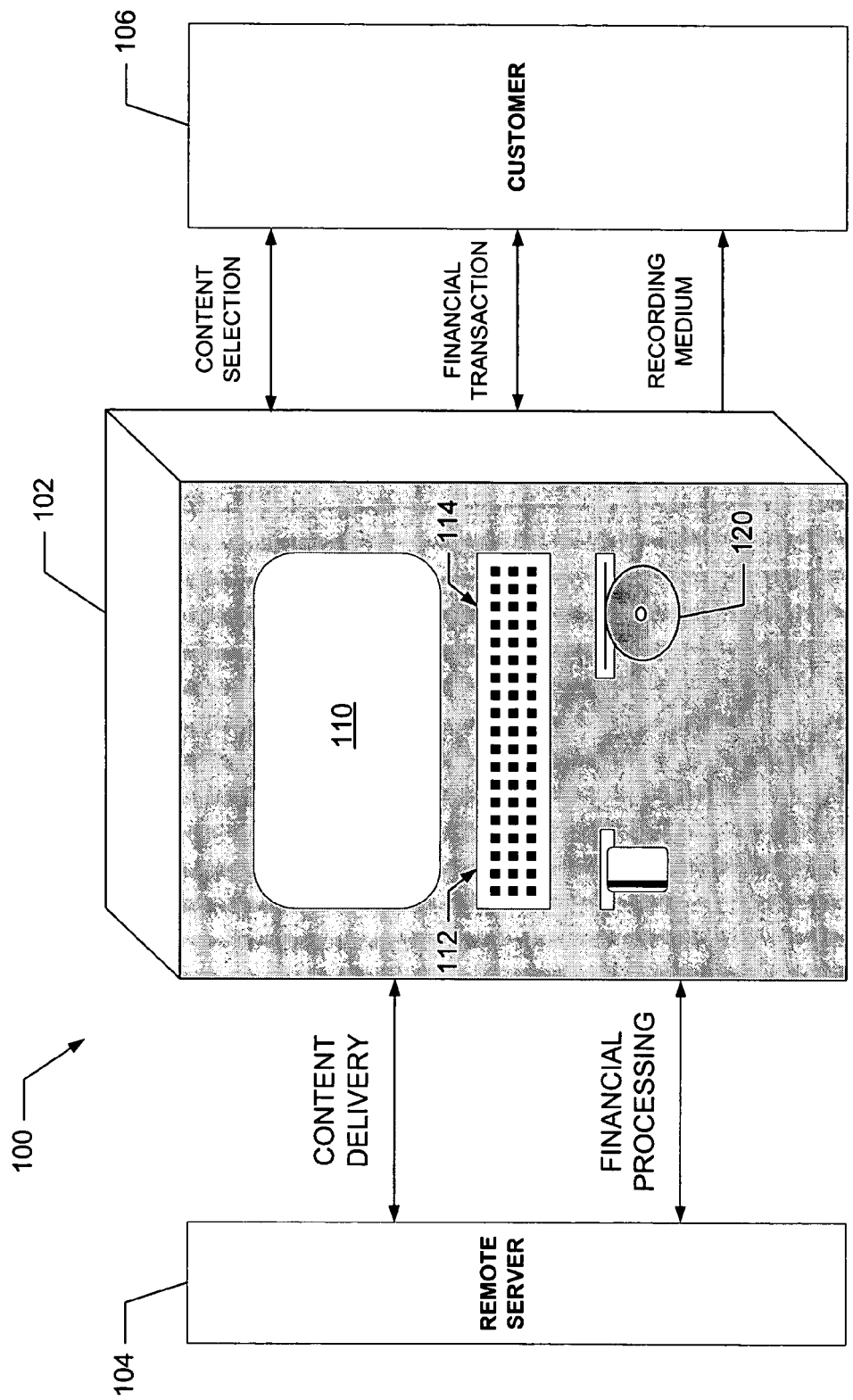
FIG. 1 is a block diagram of a media content selection and recording system including a retail distribution kiosk and a remote server in accordance with one implementation of the present invention.

In one example illustrated in FIG. 1, a media content selection and recording system 100 includes a retail distribution kiosk 102 and a remote server 104. In the illustrated example, the retail distribution kiosk 102 is placed in a location having public access, such as a store or shopping center, by a content provider. A customer 106 uses the retail kiosk 102 to build and purchase a customized article of media (hereinafter referred to as a video disk 120) by selecting a movie and other items of content. The retail kiosk 102 is an automated kiosk with a computer user interface (e.g., display 110, speakers 112, keyboard 114, touchpad, and the like).

Figure 2:
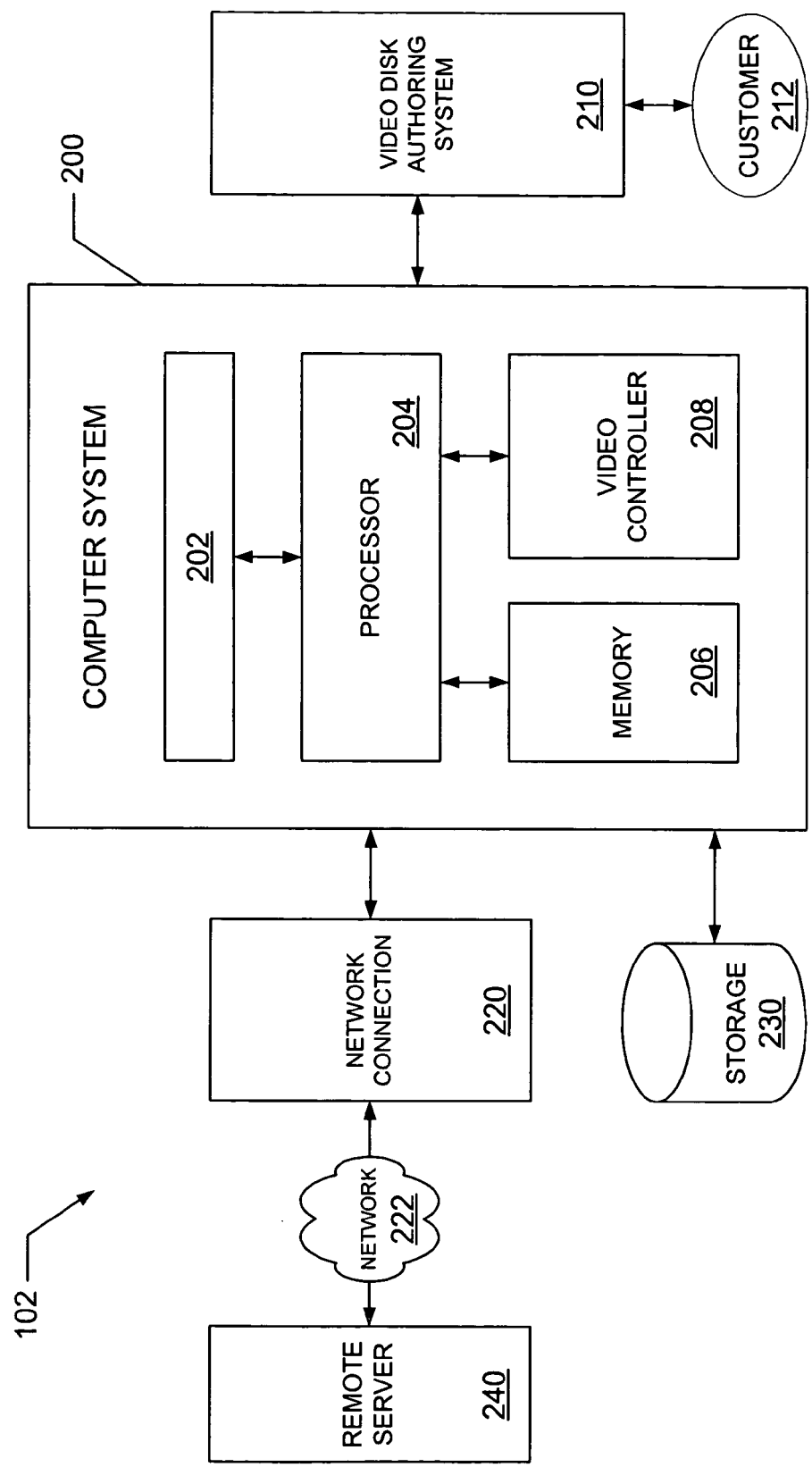
FIG. 2 is a block diagram of the retail distribution kiosk including a computer system, a video disk authoring system, a network connection, and a storage area in accordance with one detailed implementation of the present invention.

In one detailed implementation illustrated in FIG. 2, the retail kiosk 102 includes a computer system 200, a video disk authoring system 210, a network connection 220, and a storage area 230. The computer system 200 includes a processor 204, a memory 206, a video controller 208, and other related elements 202. The computer system 200 controls the operation of the kiosk 102 and its components. The video disk authoring system 210 enables the customer 212 to build and purchase a customized video disk. The network connection 220 allows the retail kiosk 102 to connect to the remote server 240 through the network 222.

Figure 3:
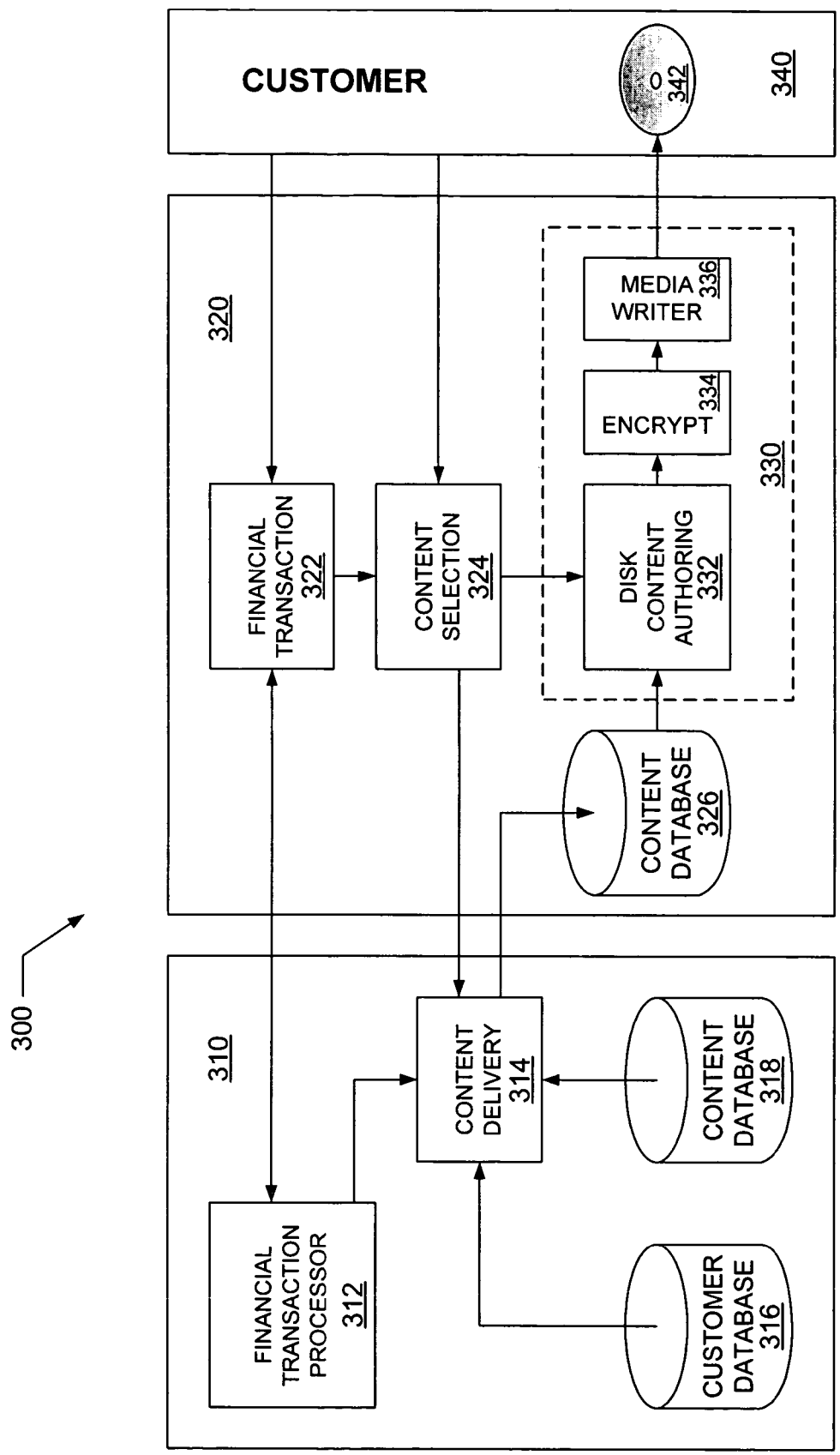
FIG. 3 is a block diagram of a media content selection and recording system including the retail distribution kiosk and the remote server in accordance with another detailed implementation of the present invention.

In another detailed implementation illustrated in FIG. 3, a media content selection and recording system 300 includes a remote server 310 and a retail kiosk 320. The retail kiosk 320 includes a financial transaction unit 322, a content selection unit 324, a video disk authoring system 330, and a content database unit 326. The retail kiosk 320 connects to the remote server 310 through a network connection. The remote server 310 includes a financial transaction processor 312, a content delivery unit 314, a customer database 316, and a content database 318.

To use the kiosk 320 to build a video disk 342, a customer 340 initiates a transaction, such as by walking up to the kiosk 320 and pressing a key on the keyboard. The content selection unit 324 of the kiosk 320 displays a catalog of movies, organized in various ways. For example, the movies can be organized according to the title, category, or any other related terms to identify the movies. The content selection unit 324 also displays other content that can be selected, such as additional related content. Other content can include audio, text, and still images.

In one example, the additional related content includes bonus content such as director commentary, subtitles, video angles, or deleted scenes. In addition, the implementation could offer the user the ability to purchase on-line enabled services or content associated with the disk, but not necessarily included on the disk (e.g. a managed or authorized copy of disk content). The movies and other items are stored locally as data in the content database unit 326 or remotely in the content database unit 318 of the remote server 310.

The content selection unit 324 enables the customer 340 to browse or search the catalogs of items and to select a movie and other content using the user interface. The content selection unit 324 then builds a list of items to put on the video disk 342. The content selection unit 320 further prompts the customer 340 for selection of options based on other user selections. Examples of options include, but are not limited to, movie format, resolution, languages, second session versions. Selection of the movie format option includes selecting widescreen or fullscreen. Selection of the languages option includes selecting audio format, subtitles, and other related language options. Selection of the second session versions includes selecting from constrained image versions. The content selection unit 324 also prompts the customer 340 to accept items selected by the content selection unit 340, such as promotional or upsell items including games, soundtracks, and other related items.

The content selection unit 324 determines which of the selected items are stored locally and which need to be retrieved from remote storage 318. For remotely-stored items, the content selection unit 324 requests the items from the content database 318 through the content delivery unit 314. The content selection unit 324 caches retrieved items for a period of time based on the popularity of the item. For some items, the content selection unit 324 keeps the data in the content database 326 for a period determined by an external service such the content provider who owns the kiosk 320. Similarly, the content provider can cause the kiosk 320 to download and store items that are popular or to be promoted such as a new movie.

In one implementation, the customer 340 also provides identification information identifying the customer 340 to the content selection unit 324. The content selection unit 324 sends the identification information to the customer database 316 of the remote server 310 through the network connection and receives a profile for the customer 340 from the content delivery unit 314 of the remote server 310. The profile reflects characteristics supplied by the customer 340 or derived based on customer activity such as past purchases. The content selection unit 324 can use the profile to suggest or select options and promotional items.

As the customer 340 selects and confirms items to add to the video disk 342, the financial transaction unit 322 determines the cumulative cost of the selected items. Each item has a cost, though some items may have a cost of zero or a negative cost as a promotional item. When the customer 340 is done adding and selecting items, the financial transaction unit 322 displays a payment interface showing the total cost and payment options (e.g., cash, credit or bank card, online account, etc.). The customer 340 selects a payment mode and provides the appropriate payment, for example, by inserting cash or a credit card. If the user selects a payment mode requiring external authorization (e.g., credit card), the financial transaction unit 322 uses the financial transaction processor 312 in the remote server 310 to contact the appropriate authorizing institution to confirm the purchase.

Although the above discussion describes a financial model in which the video disk is purchased, other financial models for providing the video disk can be selected including subscriptions and rentals. Thus, in one implementation, a fixed number of disks can be purchased in a time interval, or require that the disks be returned within a defined time period.

The video disk authoring system 330 includes a disk content authoring unit 332, an encryption unit 334, and a media writer 336. These units 332, 334, 336 can be configured in hardware, software, or combination of hardware and software. Thus, in the illustrated implementation, the video disk authoring system 330 is configured to format, encode, encrypt, and write data to the video disk 342.

For example, the disk content authoring unit 332 and the encryption unit 334 format and encrypt the selected items, or a subset of the selected items, for storage on the video disk 342 according to the selected options. The disk content authoring unit 332 adds a forensic watermark to one or more of the items (e.g., the movie), or components of the item (e.g. video, audio, or subtitles) to identify the particular copy to be placed on the video disk 342. The disk content authoring unit 332 may also use an "anti-ripping" technology to inhibit users from making copies from the video disk 342. An example of the anti-ripping technology includes Macrovision RipGuard. Other examples include technologies which introduce errors in video disk formats to prevent ripping software from reading the disks, or install software on the video disk to prevent ripping software from operating.

In one implementation, the encryption unit 334 of the video disk authoring system 330 uses Content Scrambling System (CSS) encryption, which uses multiple keys. These keys are basically a string of characters that are used to encode or decode the contents of the video disk read by the disk player. The implementation may also insert content certificates into the disk contents consistent with CSS disk authentication requirements. In another implementation, some or all items may already be encrypted when the items are downloaded to relieve the video disk authoring system 320 of encryption responsibility. In other implementations, the encryption unit 334 uses other encryption or digital rights management (DRM) technology, such as DivX. Depending on the specific technology used, the ordering of encryption, watermark inserted, compression, and labeling steps may be varied.

The encryption unit 334 writes the encrypted and formatted data to a video disk 342 using a media writer 336. The video disk 342 can be provided by the customer 340 or can be obtained from a collection of blank disks stored in the kiosk 320. The video disk 342 can be DVD recordable media such as DVD-R DVD+R, DVD+RW, or other non-standard recordable DVD disks to record data. In some implementations, the DVD recordable media includes prerecorded copy protection information, serial numbers, and/or unique numbers for security purposes. In other implementations, the DVD recordable media includes disks with secure unique serial numbers associated with prepaid financial transactions similar to prepaid phone cards. The implementation could also include support for non DVD optical disks, including any optical disk technologies which are developed to replace DVDs. The implementation could also include non optical media recordable storage including flash memory cards, magnetic storage devices, other technologies.

The video disk authoring system 330 also provides packaging for the video disk 342, such as the disk label, a box or other container, and packaging inserts. The video disk authoring system 330 selects packaging items (e.g., a promotional coupon) and inquires the customer 340 for confirmation. The customer 340 can also select packaging options, such as artwork or other customization including inserting a name, a personalized message, an image, or other information. Other information includes barcodes, customer information, and unique identifiers. This information can be applied directly onto the disk, or onto a label which is attached to the disk. This information may be user selectable, or may be bound to the financial transaction which purchased the disk.

In one example, a customer can design and purchase a customized video disk by selecting items to place on the video disk. The customer can control what content to purchase and what extra items to receive. In addition, the content provider can identify the particular copy being generated through watermarking to track user activity. The content provider can also access a customer profile to enhance the customer experience and to provide feedback to the content provider.

Figure 4A:
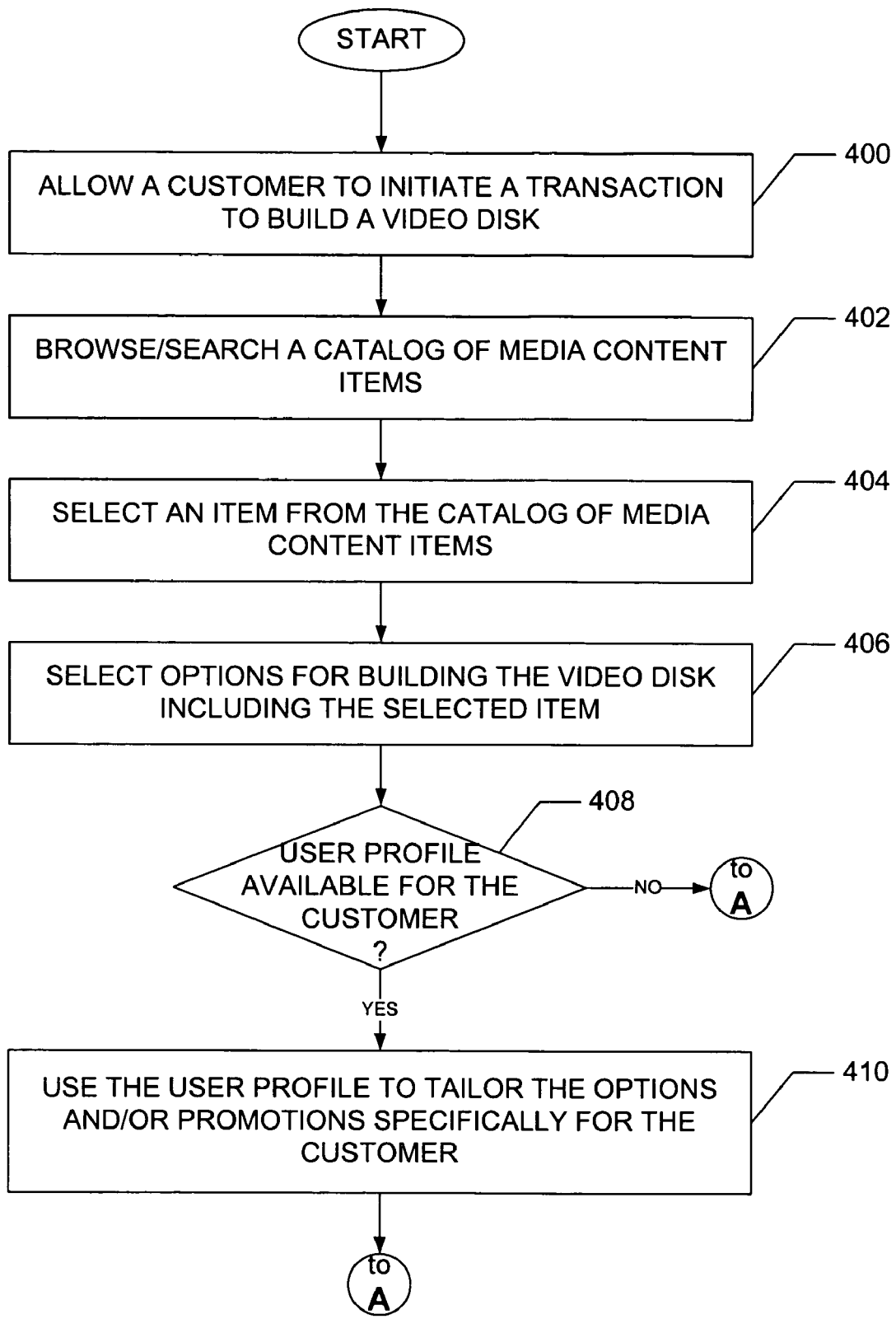
FIGS. 4A and 4B illustrate a method for selecting and recording media content data according to one implementation of the present invention.
Figure 4B:
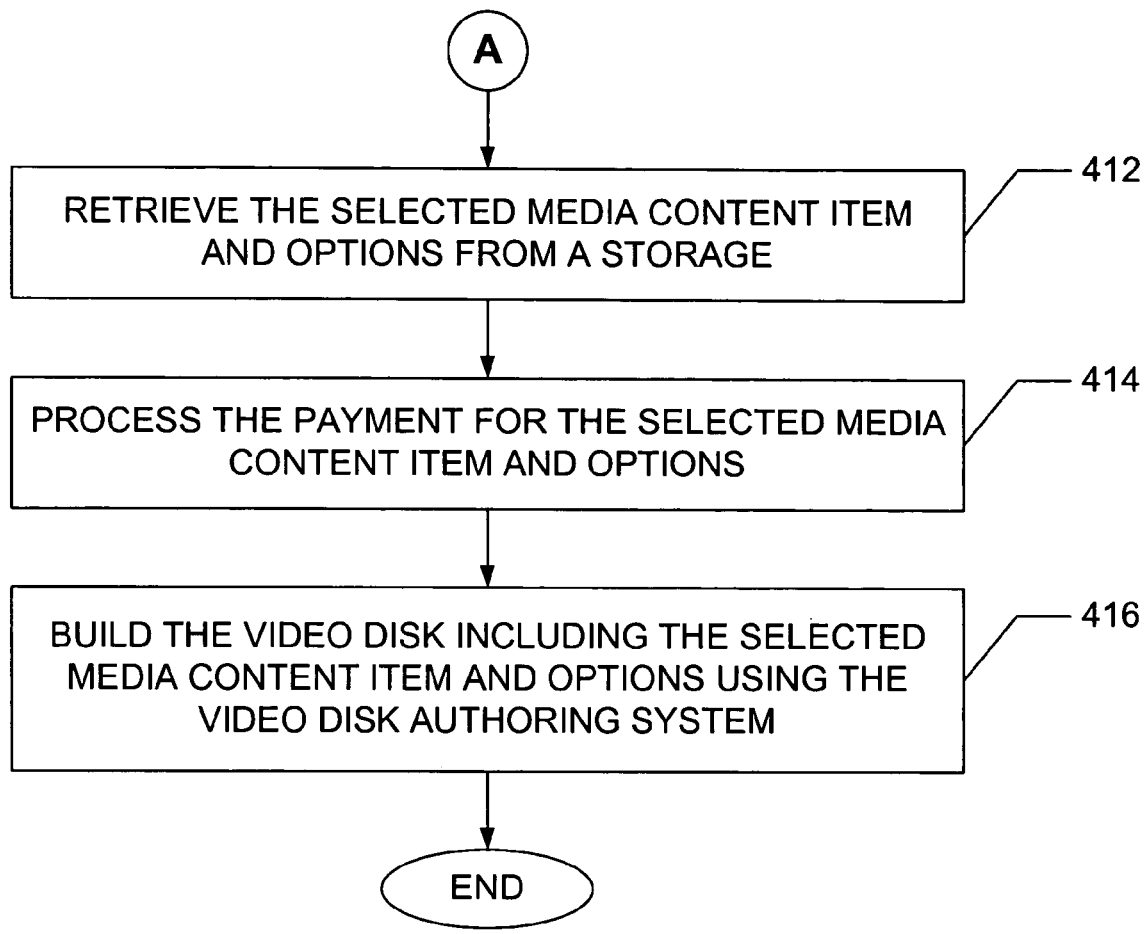

FIGS. 4A and 4B illustrate a method for selecting and recording media content data according to one implementation of the present invention. To use the kiosk 320 to build a video disk 342, a customer 340 initiates a transaction, at 400. For example, when the customer 340 walks up to the kiosk 320 and presses a key on the keyboard, the content selection unit 324 of the kiosk 320 displays a catalog of movies, organized in various ways. The content selection unit 324 also displays other content that can be selected, such as additional related content.

The content selection unit 324 enables the customer 340 to browse or search the catalogs of items, at 402, and to select a movie and other content using the user interface, at 404. The content selection unit 320 further prompts the customer 340 for selection of options based on other user selections, at 406.

In one implementation, the customer 340 may be asked to provide identification information identifying the customer 340 to the content selection unit 324. The content selection unit 324 sends the identification information to the customer database 316 of the remote server 310 through the network connection and receives a profile for the customer 340 from the content delivery unit 314 of the remote server 310. The profile reflects characteristics supplied by the customer 340 or derived based on customer activity such as past purchases. Thus, a determination is made, at 408, to determine if the user profile is available. If the user profile is available, the profile is used, at 410, to tailor the options and/or promotions specifically for the target customer 340.

As the customer 340 selects and confirms items to add to the video disk 342, the selected media content item and options are retrieved from storage, at 412, and the payment for the selected media content item and options is processed, at 414. When the customer 340 is done adding and selecting items, the financial transaction unit 322 displays a payment interface showing the total cost and payment options. The customer 340 selects a payment mode and provides the appropriate payment. A video disk including the selected media content item and options is built, at 416, using the video disk authoring system 330.

Various implementations of the invention are realized in electronic hardware, computer software, or combinations of these technologies. Some implementations include one or more computer programs executed by a programmable processor or computer. For example, a method for selecting and recording media content data as described above includes one or more programmable processors. Thus, the video disk authoring method can be implemented as a computer program stored on and executed by the disk authoring system. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations of movie distribution using the retail kiosk, other types of content can also be purchased in a similar way, such as television programs, music, books, or software. Accordingly, the present invention is not limited to only those implementations described above.

What is claimed is:

1. A system for selecting and recording data, comprising:
a network interface unit;
a local storage unit for storing a subset of media content items and other content;
a content selection unit to display a catalog of said media content items and other content, said content selection unit enabling a customer to browse, search, and select a media content item and other content from said catalog of media content items and other content, said content selection unit retrieving said selected media content item and other content from said local storage unit if said selected media content item and other content is found in said subset, and retrieving said selected media content item from a remote storage unit using said network interface unit if said selected media content item and other content is not included in said subset, said content selection unit configured to cache said retrieved media content item and other content in said local storage unit for a period of time based on the popularity of said retrieved media content item;

a financial transaction unit to determine the cost of said retrieved media content item and other content and display the cost for review and payment by the customer; and an authoring system configured to format, encode, encrypt, and write said media content item and other content onto an article of media when the customer makes the payment.

2. The system of claim 1, wherein said article of media is a video disk and said authoring system is a video disk authoring system.

3. The system of claim 2, wherein said video disk includes a writable DVD.

4. The system of claim 1, wherein said content selection unit includes an organizer to organize said catalog of said media content items according to titles of said media content items.

5. The system of claim 1, wherein said content selection unit includes an organizer to organize said catalog of said media content items according to categories of said media content items.

6. The system of claim 1, wherein said media content items include video, audio, text, and still images.

7. The system of claim 1, wherein said other content includes director commentary and deleted scenes.

8. The system of claim 1, wherein said other content includes options for playing said media content items.

9. The system of claim 8, wherein said options include at least format, resolution, languages, second session versions of said media content items.

10. The system of claim 1, wherein said other content includes promotional and/or upsell items.

11. The system of claim 10, wherein said promotional and/or upsell items includes games and soundtracks.

12. The system of claim 1, wherein said period of time is determined by a content provider providing said media content items and other content.

13. The system of claim 1, wherein said content selection unit includes a processor to process the popularity of said retrieved media content item to determine whether said media content item should be cached locally.

14. The system of claim 1, wherein said content selection unit includes a processor to receive and process a customer profile to suggest or select options and promotional items tailored to the customer.

15. The system of claim 1, wherein said media content items include a collection of movies.

16. The system of claim 1, further comprising a watermarking unit to watermark said selected media content item and other content.

17. The system of claim 1, further comprising the remote storage unit for storing media content items and other content.

18. A method for selecting and recording data, comprising:
storing a subset of media content items and other content in a local storage unit;
displaying a catalog of said media content items and other content;
enabling a customer to browse, search, and select a media content item and other content from said catalog of media content items and other content;
retrieving said selected media content item and other content from said local storage unit if said selected media content item and other content is found in said subset;
retrieving said selected media content item from a remote storage unit if said selected media content item and other content is not included in said subset;
caching said retrieved media content item and other content in said local storage unit for a period of time based on the popularity of said retrieved media content item;
determining the cost of said retrieved media content item and other content;
displaying the cost for review and payment by the customer; and formatting, encoding, encrypting, and writing said media content item and other content onto an article of media when the customer makes the payment.

19. The method of claim 18, further comprising organizing said catalog of said media content items according to titles of said media content items.

20. The method of claim 18, further comprising organizing said catalog of said media content items according to categories of said media content items.

21. The method of claim 18, further comprising processing the popularity of said retrieved media content item to determine whether said media content item should be cached locally.

22. The method of claim 18, further comprising receiving and processing a customer profile to suggest or select options and promotional items tailored to the customer.

23. The method of claim 18, further comprising watermarking said selected media content item and other content.

24. The method of claim 18, further comprising storing said media content items and other content in said remote storage unit.

25. A computer program, stored in a tangible storage medium, for selecting and recording data, the program comprising executable instructions that cause a computer to:
store a subset of media content items and other content in a local storage unit;
display a catalog of said media content items and other content;
enable a customer to browse, search, and select a media content item and other content from said catalog of media content items and other content;
retrieve said selected media content item and other content from said local storage unit if said selected media content item and other content is found in said subset;
retrieve said selected media content item from a remote storage unit if said selected media content item and other content is not included in said subset;
cache said retrieved media content item and other content in said local storage unit for a period of time based on the popularity of said retrieved media content item;
determine the cost of said retrieved media content item and other content;
display the cost for review and payment by the customer; and
format, encode, encrypt, and write said media content item and other content onto an article of media when the customer makes the payment.

26. The computer program of claim 25, further comprising executable instructions that cause a computer to organize said catalog of said media content items according to titles of said media content items.

27. The computer program of claim 25, further comprising executable instructions that cause a computer to organize said catalog of said media content items according to categories of said media content items.

28. The computer program of claim 25, further comprising executable instructions that cause a computer to process the popularity of said retrieved media content item to determine whether said media content item should be cached locally.

29. The computer program of claim 25, further comprising executable instructions that cause a computer to receive and process a customer profile to suggest or select options and promotional items tailored to the customer.

30. The computer program of claim 25, further comprising executable instructions that cause a computer to watermark said selected media content item and other content.

31. The computer program of claim 25, further comprising executable instructions that cause a computer to store said media content items and other content in said remote storage unit.

* * * * *